United States Patent Office 3,476,962
Patented Nov. 4, 1969

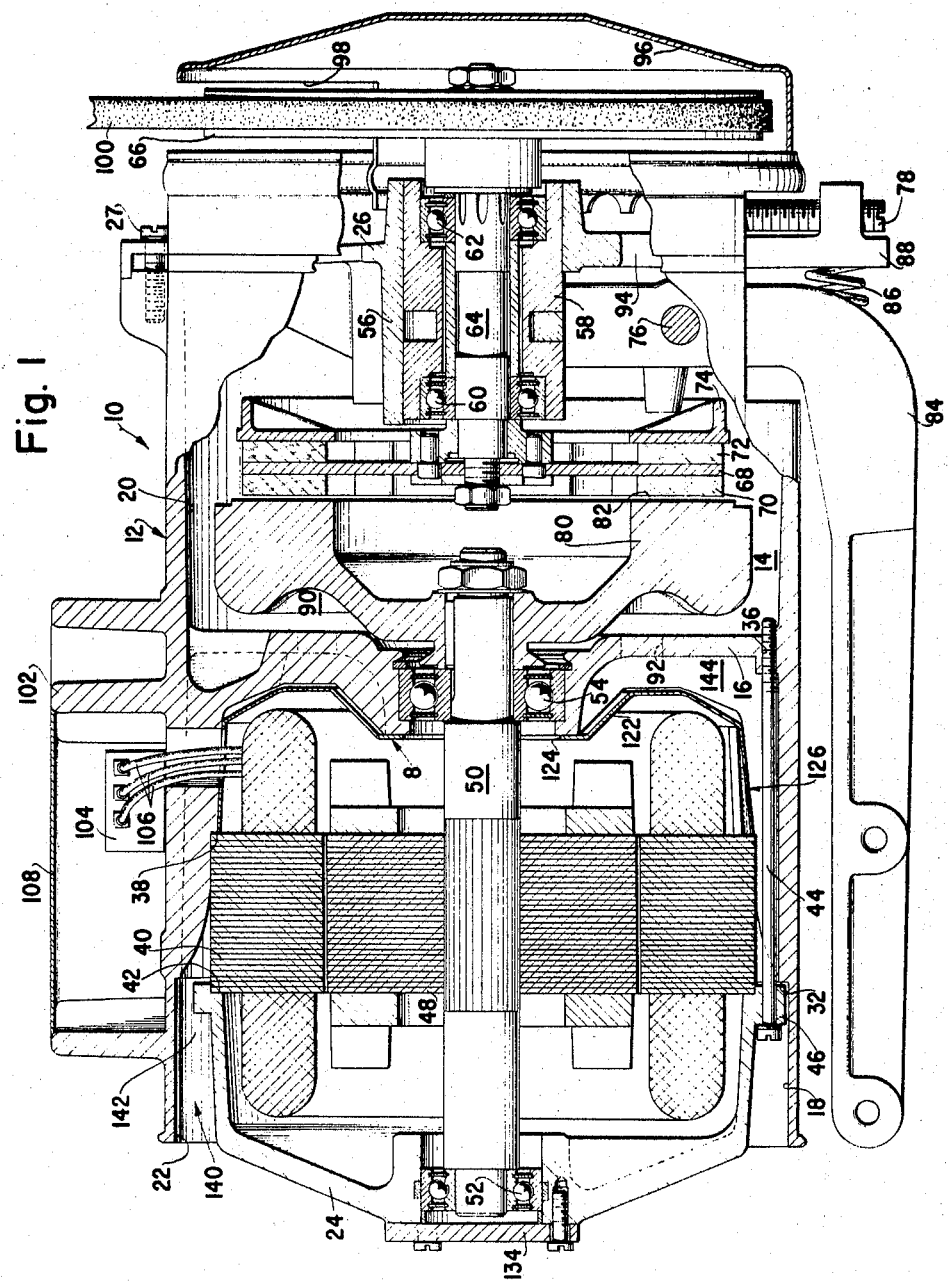

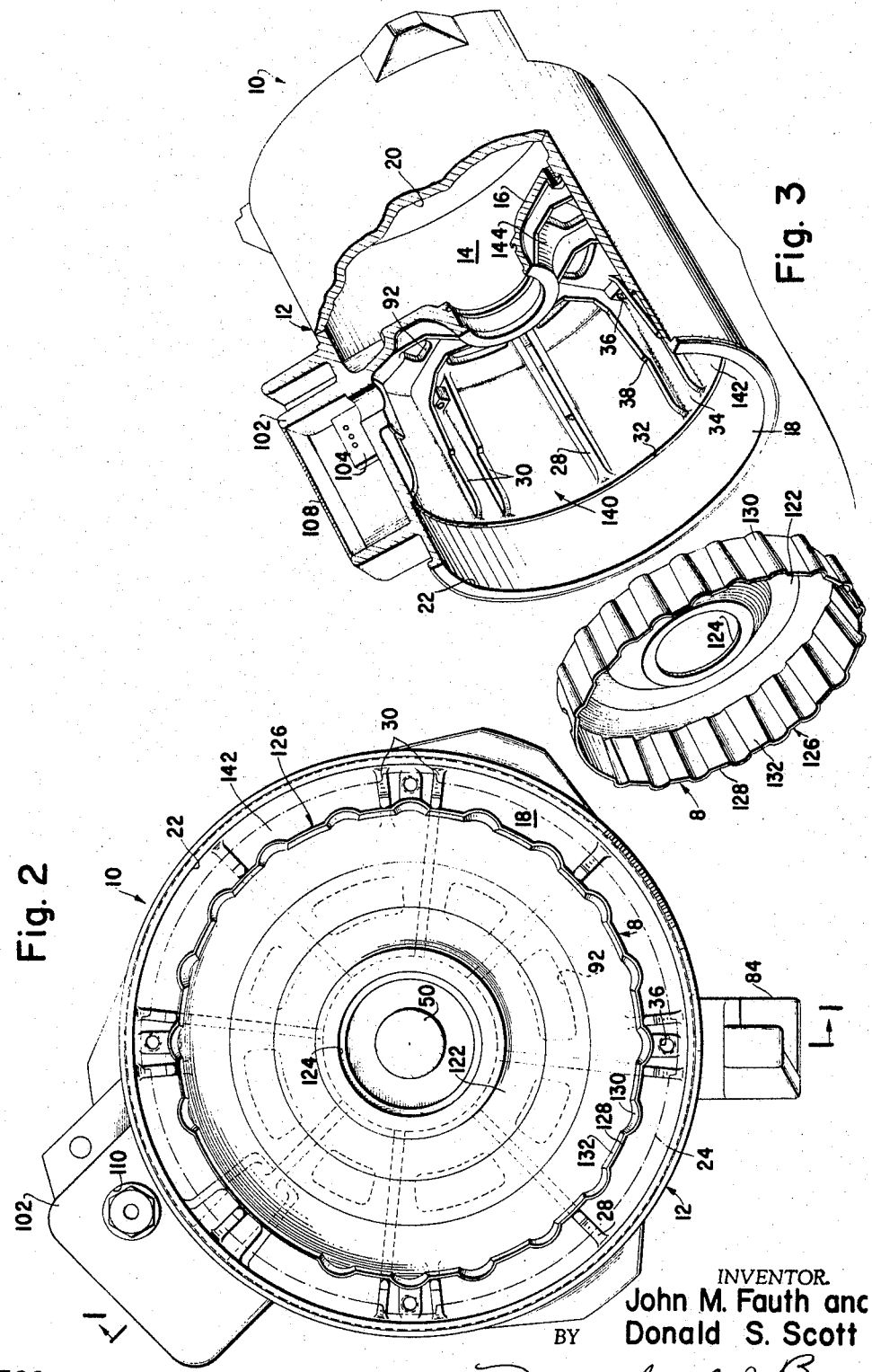

3,476,962
MOTOR WITH CLUTCH-BRAKE
ARRANGEMENTS
John M. Fauth, Bearsden, and Donald S. Scott, Dumbarton, Scotland, assignors to The Singer Company, New York, N.Y., a corporation of New Jersey
Filed Oct. 19, 1967, Ser. No. 676,516
Int. Cl. H02k 7/10, 5/00
U.S. Cl. 310—76                                6 Claims

ABSTRACT OF THE DISCLOSURE

This disclosure relates to an electric transmitter having a simplified housing. More particularly the disclosure relates to a motor shield disposed in the housing to seal one end of the motor. Furthermore, the invention relates to a housing using a motor shield in which stator cores of various stack lengths may be mounted therein.

Background of the invention

Heretofore, housings having integrally formed motor shields have been attempted but have encountered difficulty in that the relatively complex structural configuration of this die-cast motor housing has caused burn out of the dies used for making the same. In addition, the seating of stator cores in this type of housing was limited to only one or two different stack lengths. The whole effect was to severely restrict the manufacturing tolerance variations permissible for any given electric transmitter housing.

Summary of the invention

In accordance with the present invention the novel housing for an electric transmitter having a clutch-brake driving arrangement including an electric motor of the rotor-stator type, which housing has a frame in which chamber means are formed. A transverse web member divides the chamber means into a motor portion and a clutch-brake portion. A plurality of circumferentially spaced ribs are disposed in the motor portion of the chamber means into which the stator will come into seating engagement. An end cover is connected to the frame and annularly engages the end of the stator to define an outer closure member for the motor. A resilient shield member is disposed between the web member and the stator to annularly engage the end of the stator adjacent the web member to define an inner closure member for the motor.

It is therefore an object of the present invention to provide an improved housing for an electric transmitter which avoids the prior art disadvantages; which is simple, economical and reliable; which uses a separate motor shield to seal one end of the motor; which uses a resilient motor shield to seal one end of the motor; which uses a separate motor shield having flutes that permit radial expansion or contraction thereof; which will accommodate a wide range of sator core stack lengths; which uses an end closure member that seats directly on the stator in assembled position regardless of stack length of the stator; and, which has passages therein for air flow through the housing.

Other objects and advantages will be apparent from the following description of one embodiment of the invention and the novel features will be particularly pointed out hereinafter in the claims.

Brief description of the drawings

This invention is illustrated in the accompanying drawings in which:

FIGURE 1 is a longitudinal sectional view taken through an electric transmitter embodying the present invention, and taken substantially along line 1—1 of FIGURE 2.

FIGURE 2 is a front elevational view of the frame looking into the opened motor end into which the novel motor shield has been disposed.

FIGURE 3 is an exploded perspective view, partly in section, of the novel housing including the frame and motor shield thereof.

Description of the invention

In the embodiment of the invention illustrated in the drawings a novel motor shield 8 is disposed in a housing 10, that includes a frame 12, of the electric transmitter or electric clutch-brake driving device of the general type set forth in the pending patent application Ser. No. 454,-409, filed May 10, 1965, for an "Electric Clutch-Brake Driving Device," now Patent No. 3,387,157. The frame 12, is shown in the drawings substantially cylindrical, and has a longitudinal chamber 14 extending the length thereof. A transverse partition web member 16 is formed integral with frame 12 and divides the chamber 14 into a motor portion 18 and a clutch-brake portion 20.

The opened motor end 22 of frame 12 is closed by an end cover 24. A clutch end closure 26 is connected by screws 27 to frame 12 to close the opposite end thereof.

A plurality of circumferentially spaced single ribs 28 and double ribs 30 are alternately formed integrally with web member 16 and extend axially therefrom in the direction of the open end 22 in the motor portion 18 to terminate a short distance from a counter bored shoulder 32. A longitudinal groove 34 is formed between the double ribs 30 and leads to an aligned tapped hole 36 formed in web member 16. Each of the ribs 28 and 30 has a shoulder 38 machined thereon to collectively define a plane substantially perpendicular to the longitudinal axis of housing 10. A stator core 40 as shown in FIGURE 1 is coaxially guided by the ribs 28 and 30 to a seated position against the shoulders 38 and is held in clamped position by the rabbet fit 42 of the end cover 24 by taking up on the long screws 44 passing through the bosses 46 and grooves 34 to be threadedly connected into the tapped holes 36. The motor shield 8 is disposed between web member 16 and the inner end of stator core 40 to seal that end of the motor.

Shoulder 32 sets the limit for the smallest stack length of a stator core while it is apparent that longer stator cores may be seated as just described the longer stack lengths should not exceed the axial length of housing 10. The end cover 24 will engage the stator core 40 as at rabbet fit 42 regardless of the stack length of the stator core 40, however, it may be necessary to use screws of longer length than that shown in FIGURE 1 for screws 44.

A rotor core 48 is secured to a rotor shaft 50 journaled at one end of a bearing 52 supported by the end cover 24, and journaled at the other end in a bearing 54 supported by the transverse web member 16. Except for requring a different rotor core and shaft assembly to match the longer stator core, if one were used, all other operating parts would remain the same.

The clutch end closure 26 is formed with a central tubular support 56 which rotatably and slideably carries a control sleeve 58. Two spaced ball bearings 60 and 62 are fitted into bores in opposite ends of the sleeve 58 and carry a driven shaft 64 which is rotatable relative to the sleeve 58 and slideable therewith. The outer end of the driven shaft 64 carries a driven pulley assembly 66. The opposite end of the shaft 64 has mounted thereon a clutch disc 68 which carries friction facings 70 and 72 on either side thereof. A brake ring or yoke 74 is pivotally mounted on link means (not shown) that are connected to pivot about a pin 76 secured to the end closure 26.

An adjustment screw 78 is provided to enable the brake yoke 74 to be adjusted to a minimum spacing between itself and the clutch facing 72. This brake adjusting structure may be similar to that described and shown in United States Patent No. 2,735,524, to which reference may be had for a more complete understanding thereof.

A cup-shaped imperforate fly wheel 80 is fastened to the rotor shaft 50 and is provided with a clutch surface 82 selectively engageable by the friction facing 70. An L-shaped clutch and brake actuating lever 84 is pivotally carried by the pin 76 suitably supported in the end closure 26. A brake compression spring 86 is connected between boss 88 and actuating lever 84, and will normally urge the lever 84 in a clockwise direction about pin 76 as viewed in FIGURE 1. The motion of lever 84 about the pivot pin 76 moves the sleeve 58 and therefore the driven shaft 64 axially in the end closure 26 to selectively engage the clutch disc 68 in driving relation with the fly wheel 80 or in stopping relation with the brake ring 74.

In order to circulate cooling air through the electric transmitter, a series of radial flange blades 90 are formed on the fly wheel 80. Web member 16 has a plurality of radially spaced ventilating apertures 92 formed between ribs 28 and 30. As will be described hereinafter ventilating air enters an opening 22 and is delivered from motor portion 18 to apertures 92 in the clutch-brake portion 14. The centrifugal action of the blades on the air causes it to flow radially outwardly of blades 90 and around the fly wheel 80 within the clutch-brake portion 14 to be discharged throughout outlet apertures 94 made in the end closure 26. The large mass of the fly wheel 80 and the direct flow of air over it provided a combination for the absorption and dissipation of heat incident to clutch friction, which prevents overheating of the clutched parts even under the severe duty of frequent starts and stops. A pulley cover 96 is suitably secured to the frame 12 and has a cut-out portion 98 to permit passage of a belt 100 which is driven by the pulley 66.

A terminal box 102 is formed on the exterior of frame 12 and contains a three pin terminal board 104 to which motor leads 106 are connected. A cover 108 is suitably secured over the terminal box 102 and an aperture 110 in the box 102 provided access means for connection for external circuits.

In order to simplify the configuration of frame 12 an individual motor shield 8 is used to seal the inner end of the motor. The motor shield 8 may be cup shaped and made of any suitable material, as for example, sheet metal.

The motor shield 8 includes a transverse portion 122 which is slightly depressed adjacent the central opening 124 that permits the rotor shaft 50 to extend therethrough. The upper end of transverse portion 122 is formed integral with an annular flange 126 that extends in the direction away from web member 16 and terminates in an annular edge 128 that comes into abutting engagement with the inner face of stator core 40 to define a closure member for the inner end of the motor.

Motor shield 8 is made resilient by a plurality of circumferentially spaced longitudinally extending flutes 130 between which a plurality of lands 132 are formed. The flutes 130 will permit radial expansion or contraction of the flange 126 normal to the transmitter housing 10 to allow for any tolerance variations in the casting or machining of said housing.

The motor shield 8 is made in the general configuration of the corresponding ribs 28 and 30 and web member 16 whereby portions of the motor shield 8 will come into abutting engagement therewith. On assembly of the motor the shield 8 will be placed against web member 16 in the motor portion 18 of the chamber means 14. The stator core 40 will be placed in abutment with edge 128 of the motor shield 8 and the machined shoulders 38 of the ribs 28 and 30.

Access to the outer end of the rotor shaft 50 and bearing 52 is provided by a cover plate 134 screw connected to the end cover 24.

The flow of ventilating air about the laminations of the stator core 40 provide excellent cooling of the motor, which is of the totally enclosed variety. The flow is induced into the passages 140 that extend from the open end 22 of motor portion 18 to the ventilating apertures 92 formed in the transverse member 16.

The end cover 24 abuts the outer end of the stator core 40 as at 42 and on drawing up of the long screws 44 will force the core stacks of the stator core 40 against the peripheral edge 128 to place the motor shield 8 in slight compression against the web member 16. The flutes 130 of the motor shield 8 readily permit the necessary amount of yield in the assembled position.

The passages 140 include a longitudinal leg 142 and a radial leg 144. The longitudinal leg 142 is bounded by the end cover 24, the stator core 40, the flange 126 and the underside of frame 12 in the motor portion 18. The radial leg 144 extends between the transverse portion 122 and the web member 16. The passages 140 permit the flow of ventilating air from the open end 22 of frame 12 to the plurality of ventilating apertures 92 from which it passes through the clutch-brake portion 20 to be disbarged from outlet apertures 94.

It will be understood that various changes in the details, materials, arrangement of parts and operating conditions which have been herein described and illustrated in order to explain the nature of the invention may be made by those skilled in the art within the principles and scope of the invention as expressed in the claims.

Having thus set forth the nature of this invention, what we claim herein is:

1. In a housing for an electric transmitter having a clutch-brake driving arrangement including an electric motor of the rotor-stator type the combination of:
  (a) a frame,
  (b) a chamber means formed in the frame,
  (c) a transverse web member to divide the chamber means into a motor portion and a clutch-brake portion,
  (d) a plurality of circumferentially spaced ribs disposed in the motor portion of the chamber means and adapted to receive the stator in seated engagement therewith,
  (e) an end cover connected to the frame and adapted to annularly engage the end of the stator remote from the web member to define an outer closure member for the motor, and
  (f) a resilient shield member disposed between the web member and the stator to annularly engage the end of the stator adjacent the web member to define an inner closure member for the motor.

2. The combination claimed in claim 1 wherein:
  (a) said shield member including a transverse portion terminating in an annular flange,
  (b) means formed on said flange to permit limited radial movement thereof, and
  (c) means connecting the end cover to the frame and adapted to urge the end cover in the direction of the web member whereby said shield member is placed in compression.

3. The combination claimed in claim 1 wherein:
  (a) each of said ribs has a shoulder formed thereon to collectively define a plane substantially perpendicular to the motor axis with the stator abutting the shoulder along said plane,
  (b) the end cover has a smaller outer diameter than the inner diameter of the motor portion of the chamber means, and extends therein to engage against the end of the stator, and
  (c) means connecting the end cover to the frame and adapted to accommodate a wide range of stator axial lengths and corresponding rotor axial lengths.

4. The combination claimed in claim 3 wherein:

(a) tapped holes are formed in the web member in alignment with the said grooves,
(b) longitudinal grooves are formed in the ribs,
(c) bosses are formed on the end cover in alignment with the grooves,
(d) the connecting means includes screw members engaging the bosses and pass through the grooves to threadingly engage the holes in the web members.

5. The combination claimed in claim 4 wherein:
(a) air passages are formed between the outer wall of the end cover and the inner wall of the motor portion of the chamber means,
(b) the web member has a plurality of circumferentially spaced ventilating apertures in communication with said passages, and
(c) the shield member is disposed inwardly of said passages to define a substantially radial leg leading to said apertures.

6. A motor shield for sealing one end of a motor having a housing with a transverse partition and a stator mounted in the housing in spaced relation to said partition, said motor shield disposed intermediate the transverse partition and the stator, and comprising:
(a) a transverse member to partially engage the transverse partition,
(b) an annular flange extending axially away from the transverse partition, and adapted to abut the end of the stator adjacent the transverse partition, and
(c) a plurality of longitudinal flutes formed on the flange to permit limited radial expansion or contraction of the flange in a direction normal to said housing whereby said shield may be mounted snuggly against the stator.

References Cited

UNITED STATES PATENTS

| | | | |
|---|---|---|---|
| 2,003,795 | 6/1935 | Wilsing | 310—78 |
| 2,454,471 | 11/1948 | Momberg | 310—78 |
| 2,527,238 | 10/1950 | Woodson. | |
| 2,653,256 | 9/1953 | Walley | 310—76 |
| 2,877,955 | 3/1959 | Bebinger | 310—78 |

MILTON O. HIRSHFIELD, Primary Examiner

R. SKUDY, Assistant Examiner

U.S. Cl. X.R.

310—89